(12) United States Patent
Nagai

(10) Patent No.: US 6,323,757 B1
(45) Date of Patent: Nov. 27, 2001

(54) VIBRATION MOTOR ASSEMBLY

(75) Inventor: Hisami Nagai, Shizuoka (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/396,427

(22) Filed: Sep. 15, 1999

(30) Foreign Application Priority Data

Sep. 16, 1998 (JP) .................................................. 10-261075

(51) Int. Cl.⁷ ................................................... H04B 3/36
(52) U.S. Cl. .................. 340/407.1; 340/825.44; 340/825.46; 318/114; 310/81
(58) Field of Search ............................ 340/388.1, 311.1, 340/404.2, 825.44, 825.46, 407.1; 381/162, 166, 191, 415; 318/114, 460; 310/80, 81

(56) References Cited

U.S. PATENT DOCUMENTS

| | | | |
|---|---|---|---|
| 4,864,276 | * 9/1989 | Tribbey et al. | 340/407.1 |
| 4,931,765 | * 6/1990 | Rollins et al. | 340/407 |
| 5,184,037 | * 2/1993 | Kobayashi et al. | 310/26 |
| 5,436,622 | * 7/1995 | Gutman et al. | 340/825.46 |
| 5,619,181 | * 4/1997 | Murray | 340/407.1 |
| 5,668,423 | * 9/1997 | You et al. | 310/81 |
| 5,798,588 | * 8/1998 | Okuyama et al. | 310/81 |
| 5,889,349 | * 3/1999 | Yasuda | 310/261 |
| 5,898,364 | * 4/1999 | Gotou | 340/407.1 |
| 5,903,076 | * 5/1999 | Suyama | 310/81 |
| 5,936,516 | * 8/1999 | Narea et al. | 340/407.1 |
| 5,952,745 | * 9/1999 | Yasuda | 310/40 |
| 6,227,901 | * 5/2001 | Pupkiewicz et al. | 439/500 |

FOREIGN PATENT DOCUMENTS

| | | |
|---|---|---|
| 63-262069 | 10/1988 | (JP) . |
| 2-111269 | 4/1990 | (JP) . |
| 4-12486 | 1/1992 | (JP) . |
| 4-124862 | 11/1992 | (JP) . |
| 7-227061 | 8/1995 | (JP) . |
| 8-33265 | 2/1996 | (JP) . |
| 9-149591 | 6/1997 | (JP) . |

* cited by examiner

Primary Examiner—Daniel J. Wu
Assistant Examiner—Toan Pham
(74) Attorney, Agent, or Firm—Sughure, Mion, Zinn, Macpeak & Seas, PLLC

(57) ABSTRACT

In a vibration motor assembly for use in, e.g., a portable phone, a weight is mounted on the output shaft of a motor and has a hermetically closed bore filled with a magnetic fluid. A magnetic body is disposed in the bore in the vicinity of the center of rotation of the weight. When the motor is not energized, the weight is held in a halt together with the shaft of the motor. In this condition, magnetic particles included in the magnetic fluid adhere to the magnetic body due to a magnetic force acting between the particles and the body. That is, all the magnetic particles are positioned in the vicinity of the center of rotation of the weight. Consequently, even a small torque, i.e., a small current can cause the motor to start rotating. When a centrifugal force acting on the particles overcomes a magnetic force acting between the particles and the magnetic body due to an increase in rotation speed, the particles move outward away the center of rotation of the weight within the bore and reach the inner periphery of the weight. This shifts the center of gravity of the weight and thereby increases the eccentricity of the weight and therefore vibration.

11 Claims, 3 Drawing Sheets

VIBRATION MOTOR ASSEMBLY

BACKGROUND OF THE INVENTION

The present invention relates to a vibration motor assembly for use in a portable phone or similar mobile communication apparatus.

Mobile communication apparatuses extensively used today include portable phones, PHS (Personal Handyphone System) terminals, and radio pagers. The major advantage of a mobile communication apparatus is that the apparatus, in principle, can be used at any desired place. This, however, brings about a problem that the apparatus receives a call even in a train, theater or similar public space and produces an annoying alert tone. To solve this problem, the apparatus is usually provided with a silence mode for producing no alert tones in the event of call incoming or call receipt, a vibration mode for producing an alert in the form of vibration, and a memory phone function.

The vibration mode, among others, is often used because it allows the user of the apparatus to see call incoming or call receipt immediately without annoying the others. The vibration mode is generally implemented by a vibration motor assembly built in the apparatus. In the event of call incoming, for example, the vibration motor assembly is caused to vibrate in order to alert the user to the call incoming.

While the vibration motor assembly has been proposed in various forms in the past, it basically consists of a motor and a weight formed of, e.g., metal and directly mounted on the output shaft of the motor in an eccentric position. When the motor is rotated, vibration occurs due to the inertial force of the eccentric weight. However, a problem with this type of assembly is that a great initial torque and therefore a great initial current is necessary for the weight held in a halt to start rotating by overcoming the eccentricity. A sufficient initial current is not available with a miniature battery powering the above apparatus, making it difficult to start the vibration of the assembly. To reduce the required initial current, the eccentricity or the weight of the weight may be reduced. This, however, gives rise to another problem that vibration intense enough to surely alert the user to, e.g., call incoming is difficult to achieve. It is therefore difficult to implement a small initial current for driving the assembly and a sufficient degree of vibration at the same time.

Japanese Patent Laid-Open Publication Nos. 2-111269 and 63-262069, for example, each disclose a vibration motor assembly using a piezoelectric element in place of the ordinary motor. The piezoelectric element, constituting a drive source for vibration, is caused to vibrate by an ultrasonic wave. This type of assembly has a drawback that the piezoelectric element sophisticates the construction of the assembly and thereby increases the cost of the same.

Japanese Patent Laid-Open Publication No. 7-227061 and Japanese Utility Model Laid-Open Publication No. 4-12486 each teach a vibration motor assembly including a weight and reducing the required initial current by moving it with a centrifugal force. In this type of assembly, the weight is initially positioned in the vicinity of the output shaft of a motor, but sequentially moved away from the shaft due to a centrifugal force as the rotation speed of the motor increases. The assembly therefore reduces the required initial current and finally implements a sufficient degree of vibration. However, this kind of scheme is not practicable without resorting to a mechanism for movably supporting the weight and a mechanism for returning the weight to its original position, resulting in a complicated construction and a high cost. Moreover, such an assembly is susceptible to shocks and impacts and not feasible to, e.g., a mobile communication apparatus which is likely to fall by accident.

Technologies relating to the present invention are also disclosed in, e.g., Japanese Utility Model Laid-Open Publication No. 4-124862 and Japanese Patent Laid-Open Publication Nos. 8-33265 and 9-149591.

SUMMARY OF THE INVENTION

It is therefore an object of the present invention to provide a simple vibration motor assembly capable of producing a sufficient degree of vibration while needing a minimum of initial current.

A vibration motor assembly of the present invention includes a motor having an output shaft, a weight mounted on the output shaft and having a hermetically closed bore therein, a magnetic body disposed in the bore in the vicinity of the center of rotation of the weight, and a magnetic fluid filling the bore and including magnetic particles. The magnetic particles have a total volume smaller than the volume of the bore and are capable of moving in the bore. At least one of the magnetic body and magnetic particles is magnetized.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
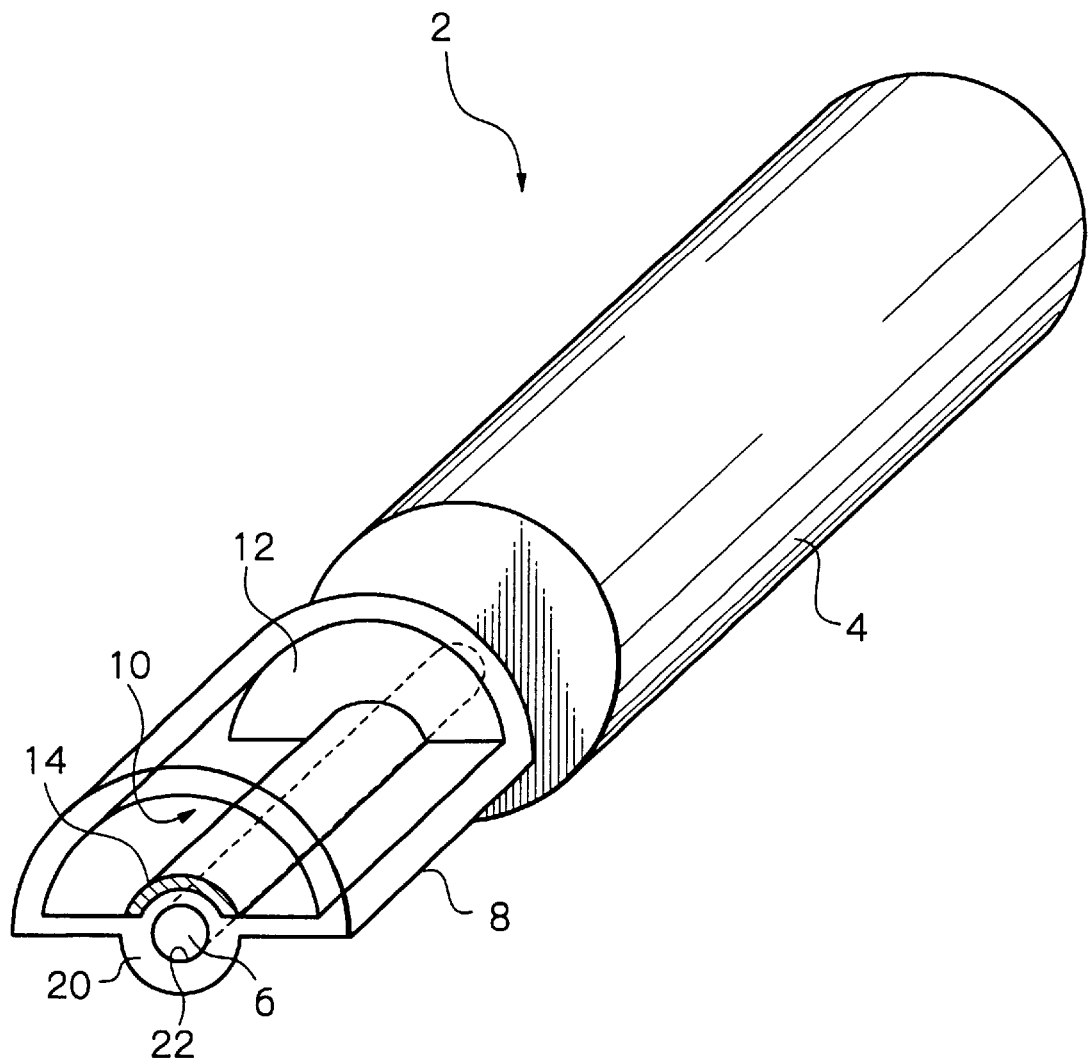
FIG. 1 is a partly perspective oblique view showing a vibration motor assembly embodying the present invention.
Figure 2:
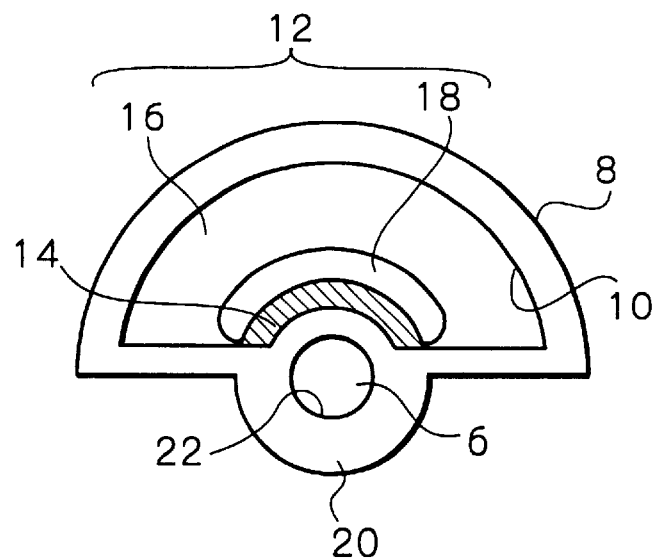
FIG. 2 is a cross-sectional view of the illustrative embodiment.

Referring to FIGS. 1 and 2, a vibration motor assembly embodying the present invention is shown and generally designated by the reference numeral 2. As shown, the assembly 2 includes a motor 4 having an output shaft 6. A weight 8 is mounted on the shaft 6 and has a hermetically closed bore 10 filled with a magnetic fluid 12. A magnetic body 14 is disposed in the bore 10 in the vicinity of the center of rotation of the weight 8.

The magnetic fluid 12 is made up of water, oil or similar medium 16 and minute magnetic particles 18 covered with a surfactant. The magnetic particles 18 have a total volume sufficiently smaller than the volume of the bore 10 and are capable of freely moving in the bore 10. In the illustrative embodiment, the magnetic particles 18 are magnetized together with the magnetic body 14.

It is to be noted that the magnetic particles 18 are not shown in FIG. 1 for the sake of simplicity of illustration, and that the particles 18 are shown in FIG. 2 in their aggregated condition.

In the illustrative embodiment, the weight 8 is implemented by a hollow molding of synthetic resin. The hollow molding has a semicircular cross-section and has its opposite ends closed. The weight 8 is mounted on the output shaft 6 of the motor 4 at substantially the center of the semicircular cross-section with its longitudinal direction substantially coinciding with the shaft 6. Further, the weight 8 includes a cylindrical portion 20 protruding from the center of the semicircular cross-section and extending in the longitudinal direction of the weight 8, as illustrated. A hole 22 extends throughout the cylindrical portion 20. The shaft 66 is press-fitted in the hole 22, so that weight 8 is affixed to the shaft 6. The magnetic body 14 disposed in the bore 10 is at least partly buried in the above cylindrical portion 20 with its surface exposed to the bore 10. The magnetic body 14 extends along the cylindrical portion 20 and covers the entire surface of the portion 20 within the bore 10.

Figure 3:
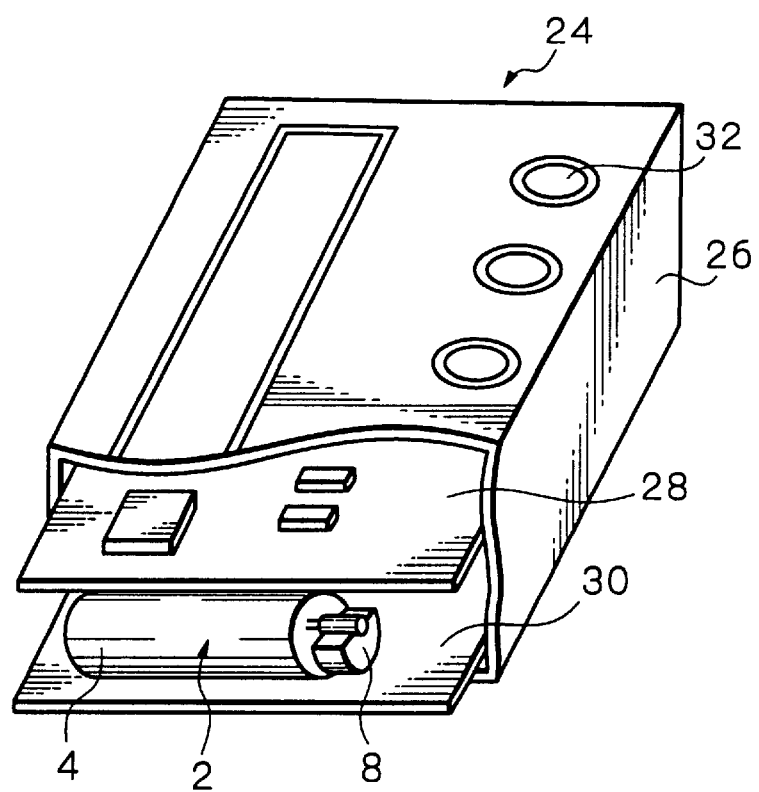
FIG. 3 is a partly taken away, oblique view showing a radio pager to which the illustrative embodiment is applied.

As shown in FIG. 3, the vibration motor assembly 2 is built in a radio pager 24 which is a specific form of a mobile communication apparatus. As shown, the radio pager 24 includes a casing 26 accommodating a receipt circuit board 28 and a control circuit board 30. A receipt circuit, not shown, is mounted on the receipt circuit board 28 for receiving and decoding coded radio data. The decoded received data, including an address number and a desired message, are transferred from the receipt circuit to the control circuit board 30. A control circuit, not shown, is mounted on the control circuit board 30 and determines whether or not the above address number is identical with an address number stored in the control circuit beforehand. If the two address numbers compare equal, the control circuit alerts the user of the pager to call incoming.

In the specific configuration shown in FIG. 3, the vibration motor assembly 2 is mounted on the control circuit board 30.

To alert the user to call incoming, the control circuit produces either sound or vibration as selected by the user on a particular button 32 beforehand. Specifically, the control circuit drives a speaker, not shown, when sound is selected or drives the motor 4 when vibration is selected.

The operation of the vibration motor assembly 2 will be described hereinafter. The receipt circuit on the receipt circuit board 28 receives radio data and feeds them to the control circuit on the control circuit board 30. If an address number included in the received data is identical with the address number stored in the control circuit, the control circuit alerts the user to call incoming, as stated earlier. When vibration, as distinguished from sound, is selected by the user beforehand, the control circuit energizes the motor 4 included in the assembly 2.

Before the energization of the motor 4, the weight 8 is held in a halt together with the shaft 6. In this condition, the magnetic particles 18 adhere to the magnetic body 14 due to a magnetic force acting between the particles 18 and the body 14. That is, all the magnetic particles 18 are positioned in the vicinity of the center of rotation of the weight 8, as shown in FIG. 2. Consequently, the center of gravity of the weight 8 adjoins the center of rotation of the weight 8. It follows that even a small torque, i.e., a small current can cause the motor 4 to start rotating.

Figure 4:
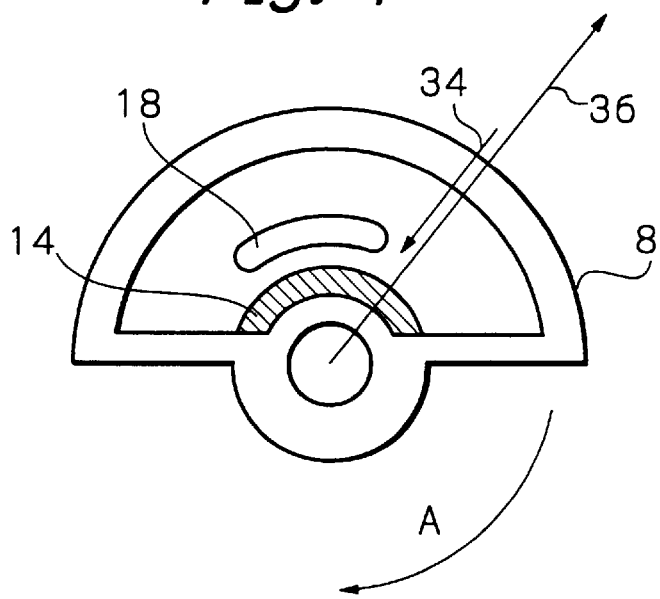
FIG. 4 is a cross-section demonstrating the operation of the illustrative embodiment.

As shown in FIG. 4, on the energization of the motor 4, the weight 8 mounted on the shaft 6 rotates together with the magnetic particles 18 in a direction indicated by an arrow A. The rotation speed of the motor 4 soon becomes high enough for a centrifugal force 36 acting on the particles 18 to overcome a magnetic force 34 acting between the particles 18 and the magnetic body 14. As a result, the particles 18 move outward away from the center of rotation of the weight 8 within the bore 10 and reach the inner periphery of the weight 8. This greatly shifts the center of gravity of the weight 8 and thereby increases the eccentricity of the center of gravity. Consequently, the vibration of the assembly 2 increases and surely alerts the user of the pager to the call incoming.

Figure 5:
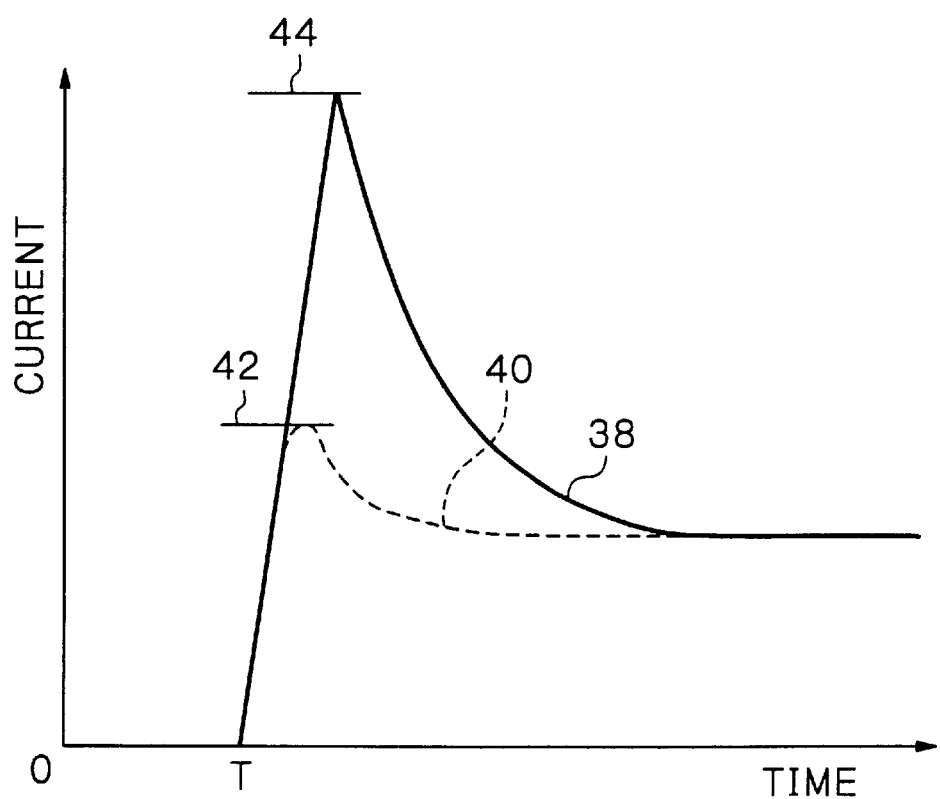
FIG. 5 is a graph comparing the illustrative embodiment and a conventional vibration motor assembly with respect to a current to flow through a motor.

FIG. 5 is a graph showing how the current flowing through the motor 4 varies, as determined by actual measurement. In FIG. 5, the ordinate and abscissa indicate current and time, respectively. A sol id curve 38 and a broken curve 40 are respectively representative of a current flown through the motor of a conventional vibration motor assembly and a current flown through the motor 4 of the illustrative embodiment. As FIG. 5 indicates, just after the current 42 has been fed to the motor 4 at a time T, it decreases to about one-half of the current 44 flowing through the conventional motor.

As stated above, the illustrative embodiment successfully reduces the initial current for causing the motor 4 to start rotating and increases the intensity of vibration at the same time. Furthers the illustrative embodiment is simple in configuration and low cost because the hollow weight 8 should only be filled with the magnetic fluid 12. This, coupled with high resistance to shocks and impacts, renders the illustrative embodiment feasible to, e.g., a mobile communication apparatus.

In the above embodiment, both the magnetic body 14 and magnetic particles 18 are magnetized. Alternatively, either the magnetic body 14 or the magnetic particles 18 may be magnetized alone so long as a magnetic force acts between them. While the magnetic body 14 has been shown and described as adjoining the center of the weight 8, the shaft 4 formed of a magnetic material may play the role of the magnetic body 14.

The cross-section of the weight 8 shown and described is only illustrative and may be replaced with a sectorial cross-section or a circular cross-section. The circular cross-section is particularly advantageous because it provides the weight 8 with a hollow cylindrical configuration capable of reducing air resistance and therefore hissing noise during the rotation of the weight 8.

The vibration motor assembly 2 may, of course, be directly mounted on the casing 26 without the intermediary of the control circuit board 30. In addition, the assembly 2 is applicable not only to the radio pager 24 but also to other various kinds of mobile communication apparatuses.

Various modifications will become possible for those skilled in the art after receiving the teachings of the present disclosure without departing from the scope thereof.

What is claimed is:

1. A vibration motor assembly comprising:

a motor having an output shaft;

a weight mounted on said output shaft and having a hermetically closed bore therein;

a magnetic body disposed in said bore in the vicinity of a center of rotation of said weight; and a magnetic fluid filling said bore and including magnetic particles;

said magnetic particles having a total volume smaller than a volume of said bore and capable of moving in said bore;

at least one of said magnetic body and said magnetic particles being magnetized.

2. An assembly as claimed in claim 1, wherein said output shaft serves as said magnetic body at the same time.

3. An assembly as claimed in claim 1, wherein said magnetic fluid further includes a liquid medium implemented by oil.

4. An assembly as claimed in claim 1, wherein said magnetic fluid further includes a liquid medium implemented by water.

5. An assembly as claimed in claim 1, wherein said magnetic particles are covered with a surfactant.

6. An assembly as claimed in claim 1, wherein said magnetic body is at least partly buried in said weight.

7. An assembly as claimed in claim 1, wherein said weight has a circular or a sectorial cross-section and closed at opposite ends thereof and is mounted on said output shaft at substantially a center of said cross-section with a longitudinal direction thereof substantially coinciding with said output shaft.

8. An assembly as claimed in claim 7, wherein said weight includes a cylindrical portion protruding from the center of the cross section and extending in the longitudinal direction of said weight, said output shaft being fixedly received in a hole extending throughout said cylindrical portion.

9. An assembly as claimed in claim 8, wherein said magnetic body is buried in said cylindrical portion in said bore with a surface thereof exposed to said bore and extends along said cylindrical portion while covering a substantially entire surface of said cylindrical portion.

10. An assembly as claimed in claim 7, wherein said weight is formed of a synthetic resin.

11. In a mobile communication apparatus including a vibration motor assembly to be driven at a time of call incoming or call receipt, said vibration motor assembly comprising:

a motor having an output shaft;

a weight mounted on said output shaft and having a hermetically closed bore therein;

a magnetic body disposed in said bore in the vicinity of a center of rotation of said weight; and a magnetic fluid filling said bore and including magnetic particles;

said magnetic particles having a total volume smaller than a volume of said bore and capable of moving in said bore;

at least one of said magnetic body and said magnetic particles being magnetized.

* * * * *